Nov. 9, 1948.    E. H. ZIMMER    2,453,611
ANTISKID DEVICE
Filed Nov. 8, 1946    2 Sheets-Sheet 2
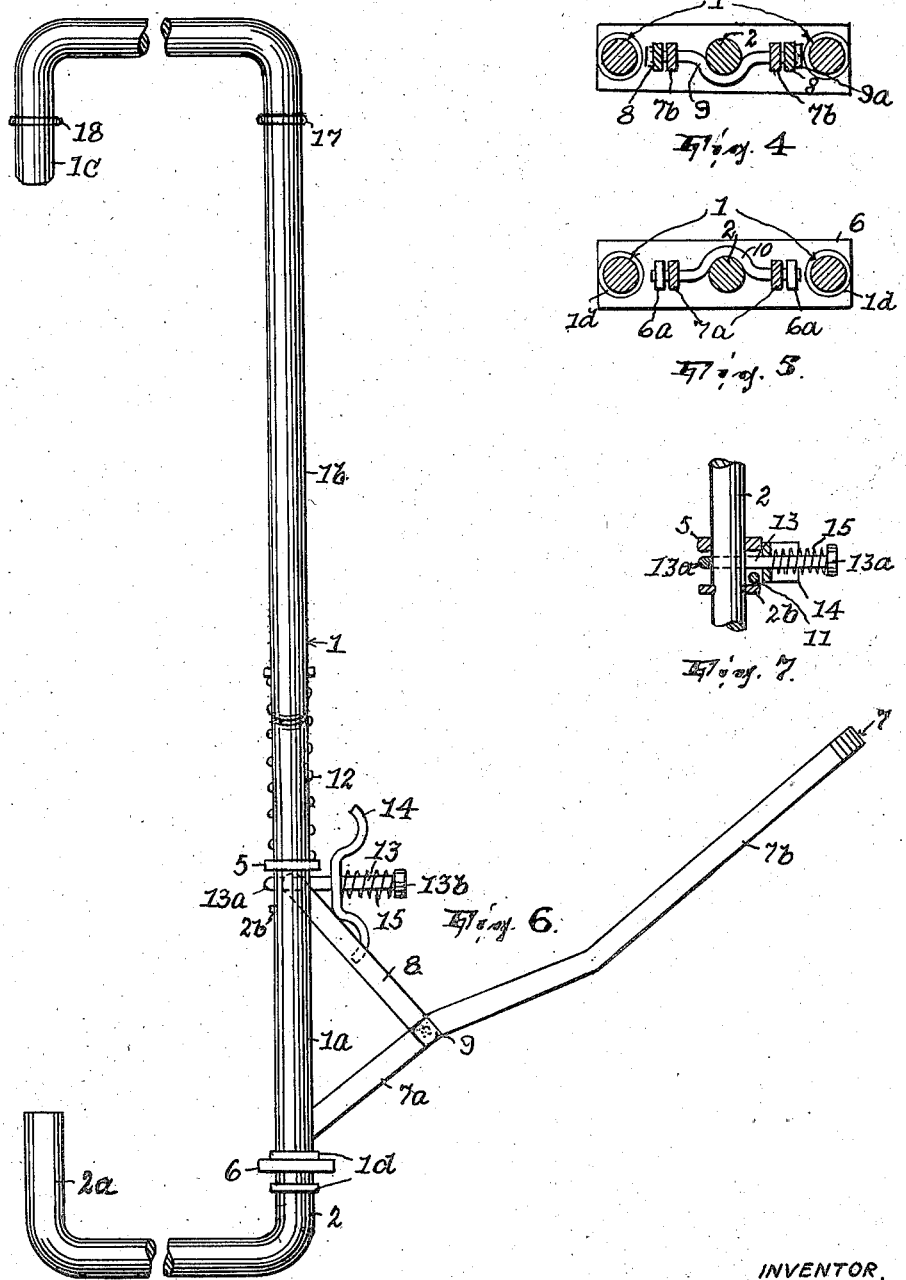
INVENTOR,
Eric H. Zimmer,
BY
John W. Steward
ATTORNEY.

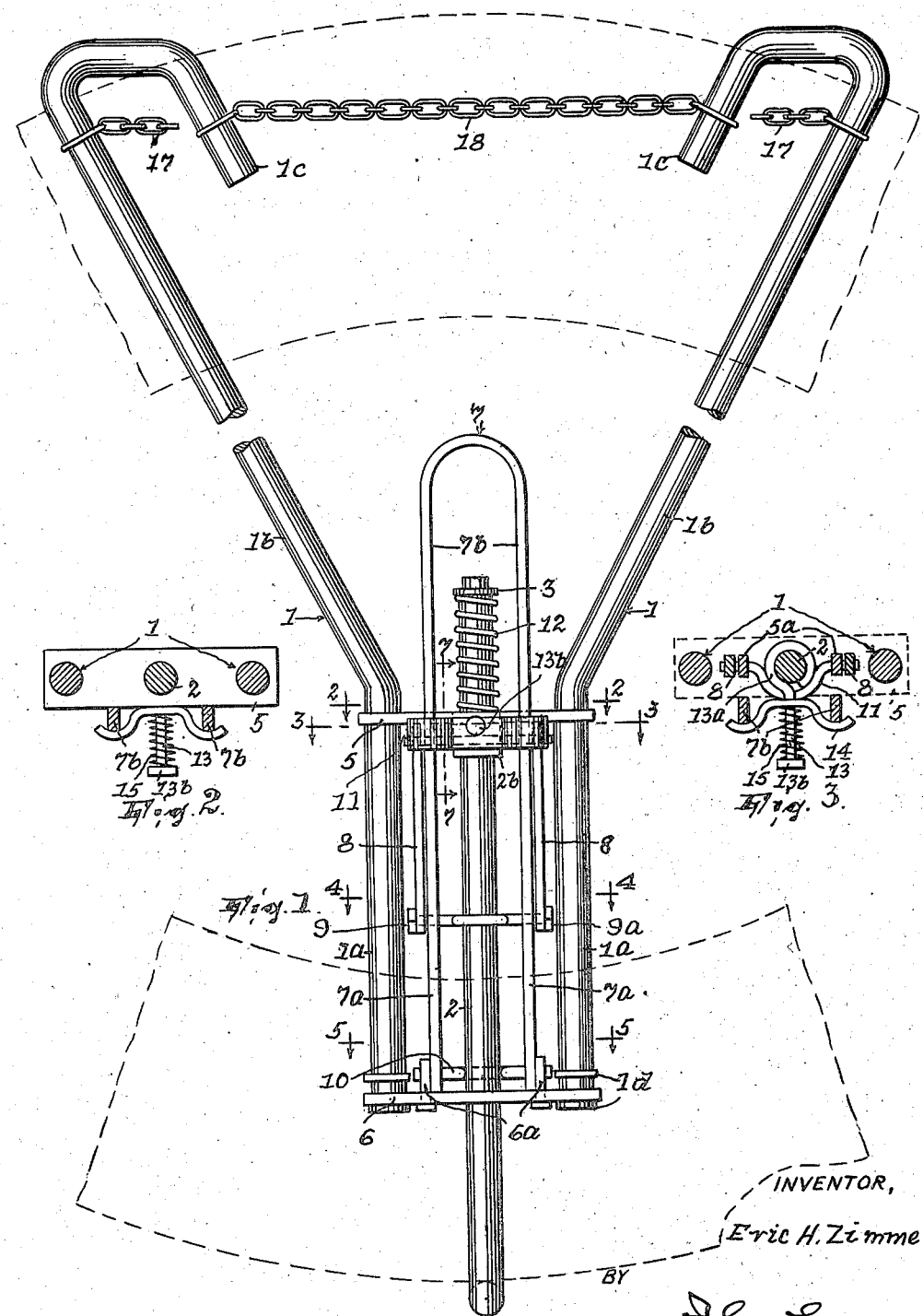

Patented Nov. 9, 1948

2,453,611

UNITED STATES PATENT OFFICE 2,453,611

ANTISKID DEVICE

Eric H. Zimmer, Wyckoff, N. J.

Application November 8, 1946, Serial No. 708,706

4 Claims. (Cl. 152—225)

In my patent No. 2,429,738 an anti-skid appliance for application to an automobile wheel is set forth which includes a plurality, i. e., at least two, hook-shaped members to hook over the wheel tread at radially spaced points thereof, means to guide the members, when said appliance is associated with the wheel, in lines crossing the tread, and means to displace said members in the respective directions to impinge their hooks against the tread. In that case the latter means exerts a pulling force on the members in affixing the appliance to the wheel and it preferably includes a tension spring. Further, in the specific form set forth, there being actually three hook-shaped members, a pair of them, on the one hand, and the third, on the other, subject by said means to movement in the respective directions, the members of said pair are connected by chains, one inside and the other outside of the wheel, for limiting their movement apart; and to the outer chain said means is releasably coupled when the appliance is operatively assembled with the wheel. According to the present invention the means for moving said members to gripping state acts to push them and a compression spring is preferably included. And, instead of securing said means in the position in which said members are held in gripping relation to the tread by releasably connecting it with one of the chains, said means is releasably secured to one of said members. The assembly of the present invention is operative with greater facility and is more efficient and reliable than that of my said application.

In the drawings,

Fig. 1 shows the appliance in gripping relation to the wheel as viewed axially and from the outer side of the latter, said appliance and the wheel, which appears in dotted outline, being partly broken away;

Figs. 2, 3, 4 and 5 are sectional views on lines 2—2, 3—3, 4—4 and 5—5, respectively, of Fig. 1;

Fig. 6 is a view of the appliance as seen from the left in Fig. 1, with the appliance in retracted state; and Fig. 7 is a view in section in the plane 7—7 indicated in Fig. 1.

As in my aforesaid application, traction elements are provided by three members 1—1 and 2 in the form of stiff rods. Each member has its straight short end portion 1a in bias relation to its long end portion 1b, whose free end is bent out of the plane of the portions 1a—1b to form a hook 1c to hook over the wheel tread provided by the usual elastic tire. Member 2, otherwise straight, has at 2a one end also bent to form a hook to hook over the tread. On the lower end of each member 1 are space fixed collars or abutments 1b. On the upper end of member 2 is an enlargement 3, forming an abutment.

The means for moving members 1—1 and 2 in the direction to cause their hooks to engage the tread, or reversely, is as follows:

5 and 6 are two couplings in the form of plates each penetrated by all three members, coupling 6 having a pair of upstanding lugs 6a and coupling 5 a pair of depending lugs 5a. Linkage connects these couplings thus: One pair of links thereof is formed at 7a by the ends of a rebent bar 7 and the other by a pair of links 8, the two pairs being pivoted together by a bolt 9, having a nut 9a and bent to accommodate member 2, and links 7a being pivoted to lugs 6a of coupling 6 by a pin 10, bent around member 2, and links 8 being pivoted to lugs 5a by a pin 11 also bent around member 2. The bar which provides links 7a, being extended beyond them at 7b to provide a handle, actually and desirably forms a lever. Since, as shown, coupling 6 is disposed between abutments 1b of each member 1 the latter will undergo up or down motion therewith, though preferably with slight lost-motion due to the spacing shown of said abutments. Coupling 5 is slidable up and down the parallel inner portions 1a of members 1. In Fig. 1 it is seen in its uppermost position, which position it assumes when the toggle linkage is straightened. Member 2 is also to undergo motion up or down with coupling 5, though also with some lost-motion, as will now appear: Between said coupling and abutments 3 is a compression spring 12 penetrated by said member, the coupling having its downward movement relatively to said member limited, through pin 11, by a fixed collar 2b on said member. The linkage consisting of pairs of links 7a and 8 is thus a toggle joint.

When the toggle linkage is moved toward a straightened condition from its buckled or collapsed state (Fig. 6) it forces members 5 and 6 apart and thus acts to collapse the members 1—1 and 2, moving members 1—1 downwardly and member 2 upwardly so that their hooks will grip the wheel tread, with desirable yield in the assembly formed by said members and the described means and due to the spring. When the toggle linkage is reversely moved or collapsed after the slight lost-motion due to the spacing of the abutments has been taken up, it causes a positive extension of said assembly for removal thereof from the wheel. Thus moving of handle 7b upwardly (Figure 6) causes the hooks 1c and 2a to move radially inwardly, and the moving of the handle downwardly causes the hooks to move radially outwardly.

Bolt 9 is bent to accommodate member 2 in the collapsed or gripping state of the appliance so that the pivot provides between the pairs of links may assume or slightly pass the dead-center relation to the pivots afforded by the pins 10 and 11, thus to maintain the appliance automatically in said relation. To permit this the bar 7, as viewed laterally (Fig. 6), has its outer portions offset outwardly of its link portions 7a. But preferably I provide a positive locking means, as follows:

A stud 13, having an end bent around member 2 at 13a and disposed between parts 5 and 11, projects outwardly and has a head 13b at its outer end. On this stud is pivoted a keeper 14 whose ends are bent to form sockets to receive the extremities of the bar 7, and penetrated by the stud and between its head and the keeper is a spring 15. In the position of Fig. 1 the keeper locks the bar in its position there shown; on turning the keeper to the position of Fig. 6 the bar may be moved to extend the appliance.

In Fig. 1 are shown chains 17 and 18, the latter broken away. As in my said application chain 17 (shown broken away) connecting the members 1 is to extend across the outer face of the tire; chain 18, connecting the hooks 1c, is to extend across the inner face of the tire.

Having thus fully described my invention what I claim is:

1. An anti-skid appliance for vehicle wheels comprising an assembly to span the wheel, said assembly including a first part having an inner and an outer end, a plurality of elongated members projecting generally radially from the outer end of such first part, said members having hooks on their outer ends to engage over the wheel tread, and a second part slideably mounted on the first part, said second part comprising an elongated member projecting in a direction generally opposite from the first named members carried by the first part, said last named member having a hook on its outer end to engage over the wheel tread, the inner end of the last named member projecting through the first part of the assembly, and toggle linkage means connected between the inner ends of the first and second parts of the assembly to move the first named elongated hook bearing members on the first part toward and away from the elongated hook bearing member on the second part to cause the hooks to engage the wheel tread and to be disengaged from the wheel tread by straightening and collapsing the toggle linkage means, respectively, and a compression spring between the toggle and the second part, whereby the hooks are yielding engaged with the wheel tread.

2. An anti-skid appliance for vehicle wheels comprising an assembly to span the wheel, said assembly including a first part having an inner and an outer end, a plurality of elongated members projecting generally radially from the outer end of such first part, said members having hooks on their outer ends to engage over the wheel tread, and a second part slideably mounted on the first part, said second part comprising an elongated member projecting in a direction generally opposite from the first named members carried by the first part, said last named member having a hook on its outer end to engage over the wheel tread, the inner end of the last named member projecting through the first part of the assembly, and toggle linkage means connected between the inner ends of the first and second parts of the assembly to move the first named elongated hook bearing members on the first part toward and away from the elongated hook bearing members on the second part to cause the hooks to engage the wheel tread and to be disengaged from the wheel tread by straightening and collapsing the toggle linkage means, respectively, a compression spring between the toggle linkage means and the second part, whereby the hooks are yieldingly engaged with the wheel tread, and means for operating the toggle comprising a lever formed as an extension of one link of the toggle so that it lies close to and generally parallel to the wheel when the toggle is straightened.

3. An anti-skid appliance for vehicle wheels comprising an assembly to span the wheel, said assembly including a first part having an inner and an outer end, a plurality of elongated members projecting generally radially from the outer end of such first part, said members having hooks on their outer ends to engage over the wheel tread, and a second part slideably mounted on the first part, said second part comprising an elongated member projecting in a direction generally opposite from the first named members carried by the first part, said last named member having a hook on its outer end to engage over the wheel tread, the inner end of the last named member projecting through the first part of the assembly, toggle linkage means connected between the inner ends of the first and second parts of the assembly to move the first named elongated hook bearing members on the first part toward and away from the elongated hook bearing member on the second part to cause the hooks to engage the wheel tread and to be disengaged from the wheel tread by straightening and collapsing the toggle linkage means, respectively, a compression spring between the toggle and the second part, whereby the hooks are yieldingly engaged with the wheel tread, and means releasably to lock the toggle linkage when in its extended state to the then adjoining portion of one member, said last named means comprising a keeper pivoted to one of the group of parts consisting of the linkage and said member and engageable with the other.

4. An anti-skid appliance for vehicle wheels comprising an assembly to span the wheel, said assembly including a first part having an inner and an outer end, a plurality of elongated members projecting generally radially from the outer end of such first part, said members having hooks on their outer ends to engage over the wheel tread, and a second part slideably mounted on the first part, said second part comprising an elongated member projecting in a direction generally opposite from the first named members carried by the first part, said last named member having a hook on its outer end to engage over the wheel tread, the inner end of the last named member projecting through the first part of the assembly, toggle linkage means connected between the inner ends of the first and second parts of the assembly to move the first named elongated hook bearing members on the first part toward and away from the elongated hook bearing member on the second part to cause the hooks to engage the wheel tread and to be disengaged from the wheel tread by straightening and collapsing the toggle linkage means, respectively, a compression spring between the toggle linkage means and the second part, whereby the hooks are yieldingly engaged with the wheel tread, means for operating the toggle comprising a lever formed as an extension of one link of the toggle so that it lies close to and generally parallel to the wheel when the toggle is straightened, and means releasably to lock the toggle linkage when in its extended state to the then adjoining portion of one member, said last named means comprising a keeper pivoted to one of the group of parts consisting of the linkage and said member and engageable with the other.

ERIC H. ZIMMER.

REFERENCES CITED

The following references are of record in the file of this patent:

FOREIGN PATENTS

| Number | Country | Date |
| --- | --- | --- |
| 1,243,711 | Christy et al | Oct. 23, 1917 |
| 1,941,935 | Erickson | Jan. 2, 1934 |
| 2,174,345 | Worthing | Sept. 26, 1939 |